United States Patent
Hanks (10) Patent No.: US 9,083,995 B1
(45) Date of Patent: Jul. 14, 2015

(54) CUSTOMER PREMISE EQUIPMENT FRAUD DETECTION

(71) Applicant: ARRIS Group, Inc., Suwanee, GA (US)

(72) Inventor: William Hanks, Carol Stream, IL (US)

(73) Assignee: ARRIS Solutions, Inc., Suwanee, FL (US)

( * ) Notice: Subject to any disclaimer, the term of this patent is extended or adjusted under 35 U.S.C. 154(b) by 127 days.

(21) Appl. No.: 13/727,162

(22) Filed: Dec. 26, 2012

(51) Int. Cl.
*H04L 29/06* (2006.01)
*G06F 21/00* (2013.01)
*H04N 21/24* (2011.01)

(52) U.S. Cl.
CPC .................................... *H04N 21/24* (2013.01)

(58) Field of Classification Search
CPC ............... G06F 21/30; H04N 21/4508; H04N 21/4532; H04N 21/25833; H04N 21/42684; H04N 21/441
See application file for complete search history.

(56) References Cited

U.S. PATENT DOCUMENTS

2011/0107436 A1* 5/2011 Cholas et al. .................... 726/29
2012/0047583 A1* 2/2012 Nyemahame et al. .......... 726/26

* cited by examiner

Primary Examiner — Izunna Okeke
(74) Attorney, Agent, or Firm — Bart A. Perkins (57) ABSTRACT

Methods, systems, and computer readable media can be operable to detect possible fraudulent use of a customer premise equipment device. Information identifying a device connected to a customer premise equipment device can be retrieved and compared to historical information identifying one or more devices previously connected to the customer premise equipment device. The customer premise equipment device can be classified as a device suspected of fraudulent use when the current information identifying a device connected to the customer premise equipment device is different than the historical information identifying the one or more devices previously connected to the customer premise equipment device.

22 Claims, 4 Drawing Sheets

CUSTOMER PREMISE EQUIPMENT FRAUD DETECTION

TECHNICAL FIELD

This disclosure relates to detecting fraudulent use of a customer premise equipment device.

BACKGROUND

In general, network operators provide their subscribers with customer premise equipment (CPE) devices (e.g., set top box (STB), home gateway, optical network unit, digital subscriber line (DSL) modem, multimedia player, multimedia terminal adapter (MTA), digital voice adapter, multimedia over coax alliance (MoCA) bridge, etc.) to receive television content signals, data services, and other services transmitted by the network operators. In some implementations, subscribers can subscribe to one or more services or content packages (e.g., video-on-demand (VoD) services, premium channels, high-definition television (HDTV) channels, high-speed data services, etc.) that are offered by a network operator. In various implementations, network operators can provide subscribers with television content and/or services through one or more of a plurality of transmission methods (e.g., broadcast, multicast or unicast). For example, some content can be broadcast to all of a network operator's subscribers. In other examples, subscriber-specific services (e.g., VoD services) can be provided to subscribers via a unicast transmission. Network operators typically provide subscribers with a STB, or other CPE device, that is programmed to receive channels and/or services to which the subscriber subscribes and to facilitate interaction with the headend for other services. Generally, while a network operator retains ownership of a CPE device, the CPE device is installed at the subscriber's premise, thus the subscriber has physical control over the CPE device throughout the duration of the subscriber's subscription with the network operator. Some subscribers can abuse this control by moving the CPE device to other premises that have not subscribed to the network operator's services.

BRIEF DESCRIPTION OF THE DRAWINGS

Like reference numbers and designations in the various drawings indicate like elements.

DETAILED DESCRIPTION

In some implementations of this disclosure, devices, systems and methods can operate to facilitate detecting fraudulent use of a CPE device. With physical control over a CPE device, subscribers have the capability to use the CPE device in ways that constitute a violation of their subscription terms of service with a network operator. For example, a subscriber's subscription terms of service might prohibit the use of a CPE device outside of a specific premise (e.g., the CPE device might be limited to use within a subscriber's premise). However, with physical control over the CPE device, a subscriber has the capability to rent, lease or install the CPE device at a premise other than the location specified in the subscription terms of service, which would constitute a violation of the subscription terms of service. A use in violation of a subscriber's subscription terms of service can be identified as a fraudulent use of the CPE device.

In various implementations of this disclosure, a device can request and receive from a CPE device, identification data associated with a device connected to the CPE device. For example, a device can retrieve display identification data associated with a display device connected to a STB (e.g., information associated with a display device connected to the STB including device manufacturer identity, product code, serial number, etc.). A change in identification data associated with a device connected to a CPE device can evidence a relocation of the CPE device (e.g., the CPE device being used in a premise other than the one provided for by the subscription terms of service). While subscription terms of service do not typically prohibit connection of a different device to a CPE device within a subscriber's premise, a change in identification data associated with a device connected to the CPE device can support classification of the CPE device as a device suspected of fraudulent use. Furthermore, a change in identification data associated with a device connected to a CPE device can be coupled with other data gathered from the CPE device (e.g., variance in upstream channels used by the CPE device or variance in timing offset for the CPE device) to determine whether the CPE device is being used fraudulently.

Figure 1:
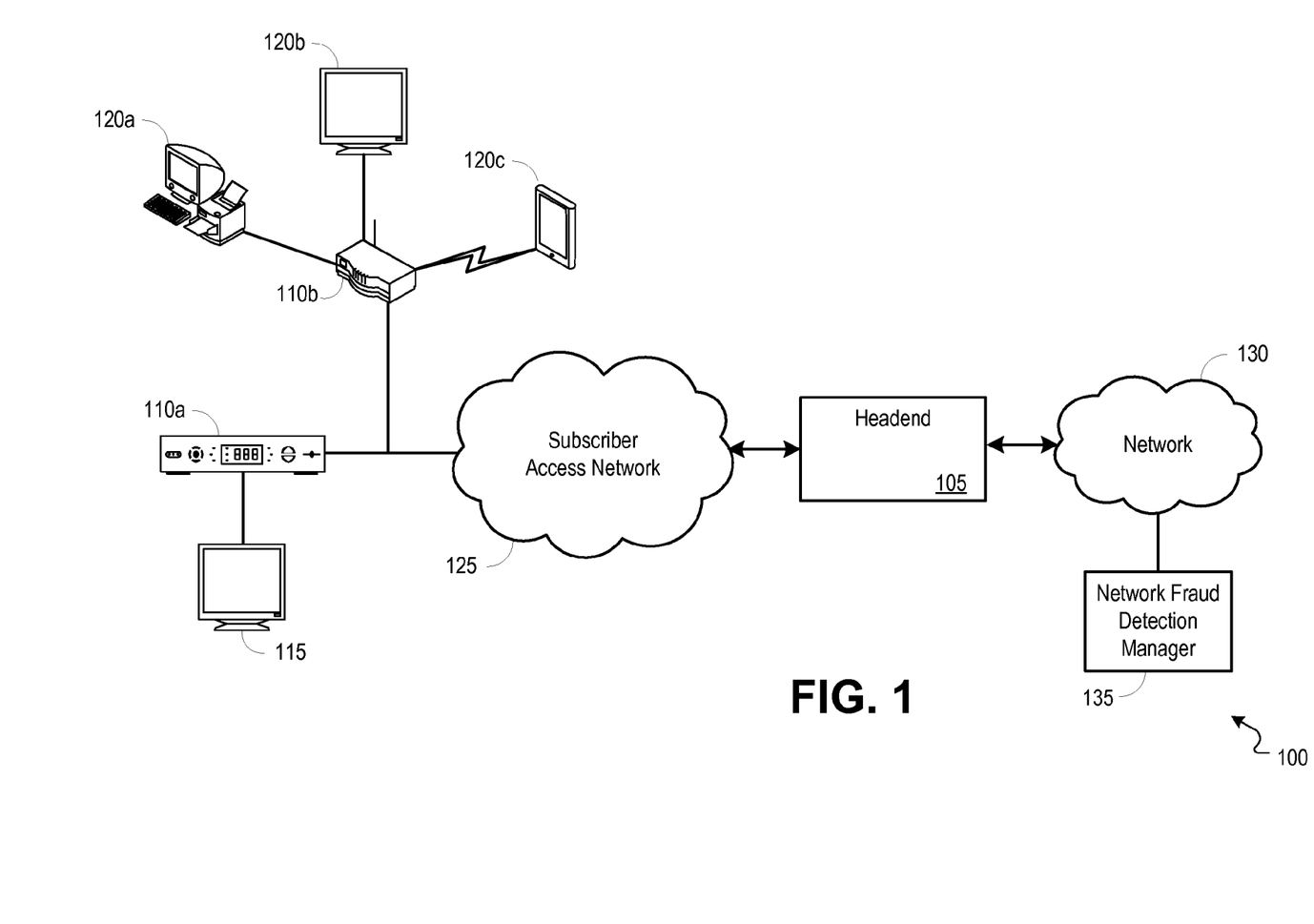
FIG. 1 is a block diagram illustrating an example network environment operable to detect fraudulent use of a customer premise equipment device.

FIG. 1 is a block diagram illustrating an example network environment 100 operable to detect fraudulent use of a CPE device. In some implementations, a headend 105 can provide video content and/or services, data services, and/or other services to a variety of CPE devices (e.g., STB, home gateway, optical network unit, DSL modem, multimedia player, MTA, digital voice adapter, MoCA bridge, etc.) in one or more subscriber groups (e.g., service group(s)). For example, a STB 110*a* can facilitate communications from the headend 105 to a display device 115 (e.g., television, computer monitor, etc.) or a digital video recorder (DVR). In some implementations, the STB functionality can be integrated into the DVR.

In some implementations, a CPE device 110*a-b* can communicate with a headend 105 via a subscriber access network 125 (e.g., hybrid fiber-coax (HFC) network). The headend 105 can facilitate communications between a network 130 and the CPE device 110*a-b*. In various implementations, the network 130 can include one or more networks internal to the headend and/or one or more networks external to the headend (e.g., one or more extranets, the Internet, etc.). For example, one or more video sources may provide streaming data through the network 130 to the headend 105.

In some implementations, the headend 105 can separate video content into various streams or channels to be transmitted (e.g., broadcast, multicast, unicast, etc.) to one or more CPE devices 110*a-b*. For example, the headend 105 can separate video content into one or more packages of video content to be transmitted to one or more of a plurality of subscriber groups (e.g., a group of subscribers receiving the same or similar video content). In some implementations, the headend 105 can facilitate communications between a CPE device 110*a-b* and a VoD server (not shown). For example, the headend can designate a channel or program transport stream to provide VoD services, and a client can request specific video content from the VoD server.

In some implementations, a network fraud detection manager 135 can be operable to detect fraudulent use of a CPE device 110a-b. For example, the network fraud detection manager can query a STB 110a to identify a display device 115 connected to the STB and can receive display identification data associated with the STB via a headend 105. As another example, the network fraud detection manager can query a media gateway 110b to identify one or more peripheral devices 120a-c (e.g., computer, television, mobile device, tablet, printer, media player, etc.) connected to the media gateway and can receive device identification data associated with the media gateway via the headend. In various implementations, the network fraud detection manager 135 can compare display or device identification data associated with a CPE device to prior display or device identification data associated with the CPE device (e.g., historical identification data) to determine whether the CPE device can be classified as a device suspected of fraudulent use. In some implementations, a network fraud detection manager 135 can maintain a list of CPE devices suspected of fraudulent use.

In some implementations, a CPE device 110a-b can receive identification data associated with a device connected to the CPE device through an interface connecting the device to the CPE device. For example, a STB 110a can receive display identification data associated with a display device connected to the STB through an interface connecting the display device to the STB (e.g., high-definition multimedia interface (HDMI)). As another example, a media gateway 110b can receive peripheral identification data associated with one or more peripheral devices connected to the media gateway through an interface connecting the one or more peripheral devices to the media gateway (e.g., Wi-Fi interface, MoCA interface, etc.). In various implementations, a CPE device 110a-b can receive identification data associated with a display device or peripheral device whenever the display device or peripheral device is connected to the CPE device.

Figure 2:
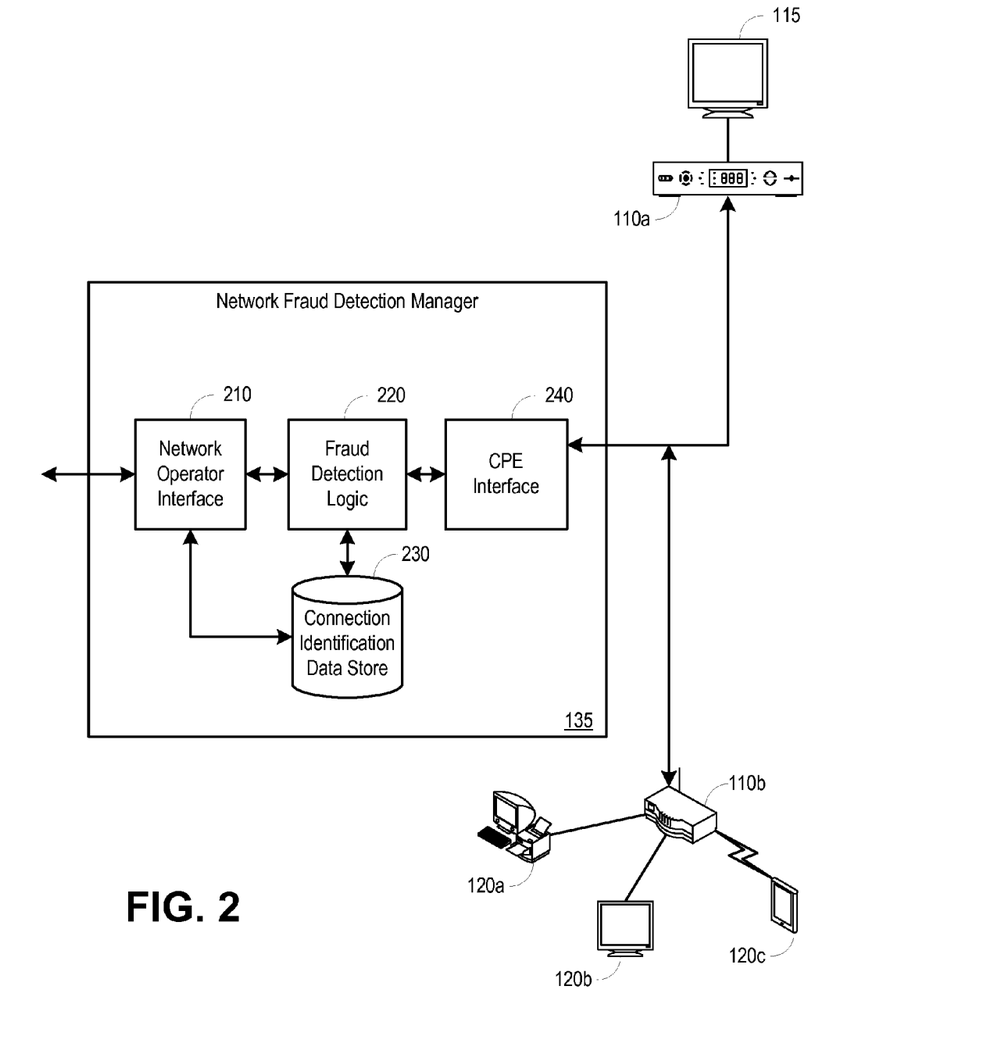
FIG. 2 is a block diagram illustrating an example device operable to facilitate detecting fraudulent use of a customer premise equipment device.

FIG. 2 is a block diagram illustrating an example device 135 operable to facilitate detecting fraudulent use of a CPE device. The device 135 can include a network operator interface 210, fraud detection logic 220, a connection identification data store 230, and a CPE interface 240. The network operator interface 210 can be used to send output data to a network operator and to receive input data from the network operator. In some implementations, the network operator interface can be used to send data to and receive data from one or more devices external to the device 135 (e.g, external storage device).

In some implementations, fraud detection logic 220 can receive device identification data associated with one or more display devices 115 connected to a STB 110a or peripheral devices 120a-c connected to a media gateway 110b. For example, the fraud detection logic can receive display identification data or peripheral identification data through the CPE interface 240. In various implementations, the fraud detection logic 220 can compare received display identification data or peripheral identification data associated with one or more display devices or peripheral devices connected to the CPE device to prior display or peripheral identification data (e.g., historical identification data) associated with one or more display or peripheral devices previously connected to the CPE device. For example, the fraud detection logic can request and receive prior display identification data (e.g., historical display identification data) from a STB 110a through the CPE interface (e.g., a STB can store display identification data associated with one or more display devices that are or have been connected to the STB). As another example, the fraud detection logic can request and receive prior display or peripheral identification data from a data store (e.g., connection identification data store 230) or an external storage device. In some implementations, if the received display or peripheral identification data associated with the one or more display or peripheral devices connected to the CPE device is different from the prior identification data associated with one or more display or peripheral devices previously connected to the CPE device, the fraud detection logic 220 can identify the CPE device as a device suspected of fraudulent use.

In some implementations, fraud detection logic 220 can correlate received display or peripheral identification data associated with a CPE device with fraudulent use data (e.g., identity of upstream channels used by the CPE device, variance in timing offset, etc.) associated with the CPE device. For example, a difference between current display or peripheral identification data and prior display or peripheral identification data associated with a CPE device can provide further evidence of fraudulent use of the CPE device when the difference is correlated with a difference in upstream channels used by the CPE device or a variance in timing offset associated with the CPE device. Thus, a profile can be defined which identifies various combinations of circumstances that evidence fraudulent behavior, such that when a device matches the profile, the device can be identified as being used in a fraudulent manner.

In some implementations, fraud detection logic 220 can compare an input type (e.g., HDMI, component video interface, composite interface, s-video interface, digital visual interface, Wi-Fi interface, MoCA interface, etc.) associated with the connection between a CPE device and one or more display or peripheral devices to input types associated with connections between the CPE device and one or more display or peripheral devices previously connected to the CPE device. In such implementations, when an input type associated with the connection between a CPE device and one or more display or peripheral devices is different from one or more input types associated with connections between the CPE device and one or more display or peripheral devices previously connected to the CPE device, the fraud detection logic 220 can identify the CPE device as a device suspected of fraudulent use.

In some implementations, the device 135 can be operable to facilitate detecting fraudulent use of a media gateway 110b. Generally, a media gateway can receive one or more signals from a headend and transmit the one or more signals to a plurality of devices (e.g., television, computer, media player, mobile device, tablet, etc.). In various implementations, fraud detection logic 220 can compare display or peripheral identification data associated with a display or peripheral device connected to a media gateway to prior display or peripheral identification data (e.g., historical identification data) associated with one or more display or peripheral devices previously connected to the media gateway. In such implementations, where the display or peripheral identification data associated with the one or more display or peripheral devices connected to the media gateway is different from prior display or peripheral identification data associated with one or more display or peripheral devices previously connected to the media gateway, the fraud detection logic 220 can identify the media gateway as a device suspected of fraudulent use. In some implementations, a difference between current display identification data and prior display identification data associated with a media gateway can be correlated with a difference between device identification data associated with a computer connected to the media gateway and device identification data associated with one or more computers previously connected to the media gateway. In such implementations, the difference between device identification data associated with a computer currently connected to the media gateway and device identification data associated with one or more computers previously connected to the media gateway can provide further evidence of fraudulent use of the media gateway.

In some implementations, fraud detection logic 220 can access a list of CPE devices suspected of fraudulent use and identify one or more CPE devices to query for display and/or peripheral identification data. For example, fraud detection logic can access query data (e.g., location of a CPE device, prior display and/or peripheral identification data received from a CPE device, the time at which display and/or peripheral identification data was last received from a CPE device, etc.) associated with CPE devices suspected of fraudulent use from storage (e.g. from a connection identification data store 230 or an external storage device, etc.). In various implementations, fraud detection logic can use query data associated with CPE devices suspected of fraudulent use to identify one or more CPE devices to query. As an example, fraud detection logic can identify one or more CPE devices to query based on the length of time since display and/or peripheral identification data was last received from the one or more CPE devices. In other implementations, fraud detection logic 220 can periodically query one or more CPE devices.

In some implementations, a connection identification data store 230 can be operable to store information and/or data associated with a plurality of CPE devices. In various implementations, the connection identification data store can be operable to store prior display and/or peripheral identification data (e.g., historical identification data) received from one or more CPE devices. In some implementations, the connection identification data store can be operable to store query data (e.g., location of a CPE device, the time at which display and/or peripheral identification data was last received from a CPE device, etc.) associated with CPE devices possessed by subscribers of a network operator. In some implementations, the connection identification data store can be operable to store fraudulent use data (e.g., identity of upstream channels used by CPE devices, variance in timing offset, etc.) associated with any of a plurality of CPE devices suspected of fraudulent use.

In some implementations, a CPE interface 240 can be operable to provide an interface, for example, to one or more CPE devices (e.g., STB 110a, media gateway 110b, as well as other devices owned by a network operator but leased or controlled by a subscriber). In various implementations, the CPE interface can be used to send queries/requests for display and/or peripheral identification data to one or more CPE devices and to receive display and/or peripheral identification data from one or more CPE devices. While a direct connection is shown between the CPE interface 240 and CPE devices 110a-b, it should be understood that in some implementations, the CPE interface can be a generic network interface, e.g., an interface to any of an HFC network, local area network (LAN), wide area network (WAN), or other applicable network.

In some implementations, a CPE device 110a-b can retrieve display and/or peripheral identification data associated with one or more display devices 115 or peripheral devices 120a-c through an interface connecting the CPE device and the one or more display devices and/or peripheral devices (e.g., HDMI, RCA connector, Wi-Fi interface, MoCA interface, etc.). For example, when a display device 115 is connected to a STB 110a via an HDMI connection, the display device can send data identifying itself to the STB (e.g., device manufacturer identity, product code, serial number, etc.) through the HDMI connection. As another example, a STB can request identification data from a display device connected to the STB through an HDMI connection. As still another example, a media gateway 110b can request and receive from one or more peripheral devices (e.g., computer, television, mobile device, tablet, etc.), data or information identifying the peripheral devices (e.g., device manufacturer identity, product code, serial number, service set identifier (SSID), security parameters associated with the device, etc.) via the connection between the media gateway and the one or more peripheral devices (e.g., Wi-Fi connection, MoCA connection, etc.). In some implementations, a CPE device 110a-b can store and maintain a connection inventory (e.g., a list of display and/or peripheral identification data associated with one or more display and/or peripheral devices that are or have been connected to the CPE device). For example, when display and/or peripheral identification data is received by a CPE device 110a-b, the display and/or peripheral identification data can be stored and time-stamped to identify the time at which the data was received by the CPE device. In still further implementations, the CPE device can receive display and/or peripheral information from a subscriber, e.g., through a user interface associated with a display or peripheral device. In such implementations, subscribers who modify the display or peripheral information with a threshold frequency can be identified as potentially fraudulent users of the CPE device.

Figure 3:
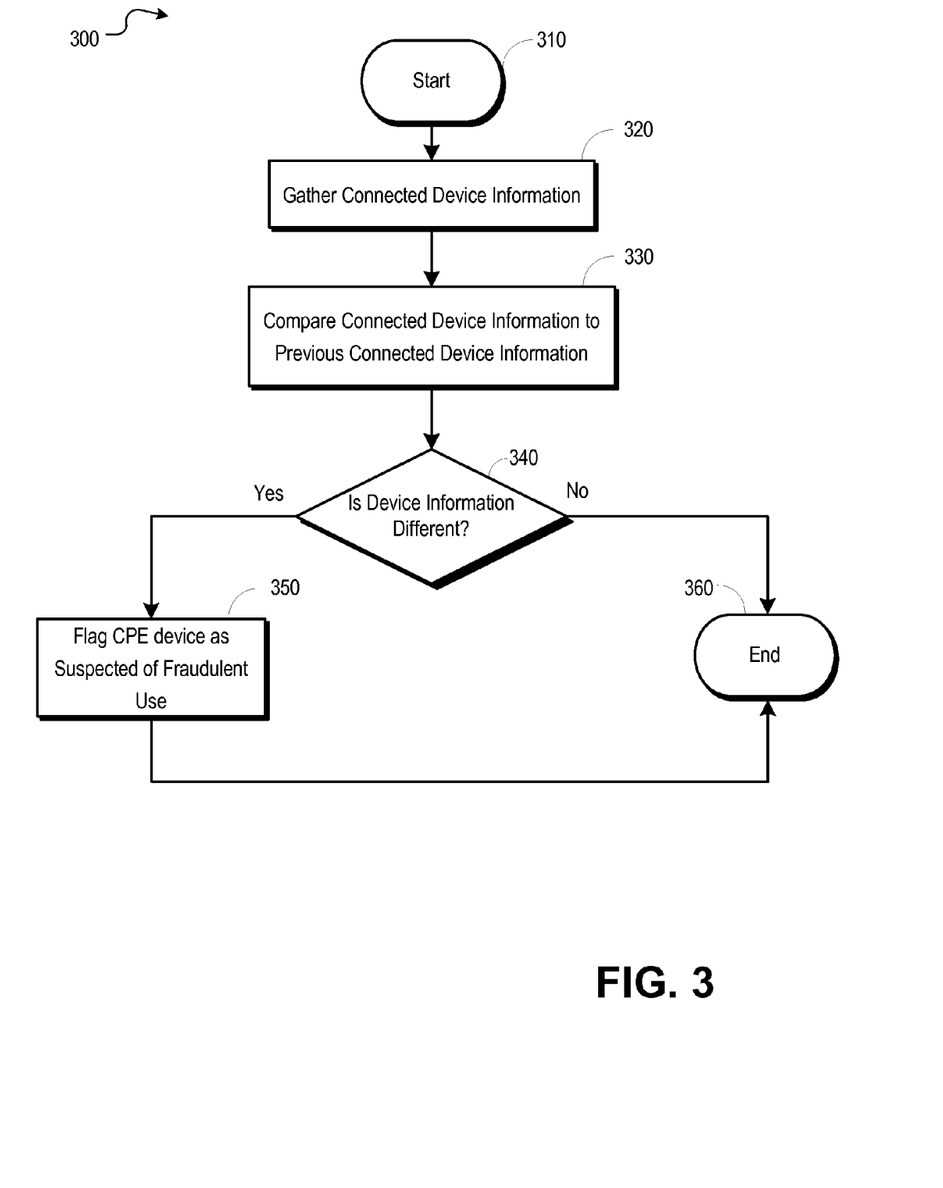
FIG. 3 is a flowchart illustrating an example process operable to facilitate detecting fraudulent use of a customer premise equipment device.

FIG. 3 is a flowchart illustrating an example process 300 operable to facilitate detecting fraudulent use of a CPE device. The process 300 can start at stage 310 when a request is made for the identification of a display or peripheral device (e.g., a television, computer, mobile device, tablet, printer, etc.) connected to a CPE device. In some implementations, a network operator, through a network performance device (e.g., network fraud detection manager 135 of FIG. 1), can request identification of display and/or peripheral devices connected to one or more CPE devices. In other implementations, a network fraud detection manager can identify specific CPE devices to query (e.g., identification of CPE devices to query can be based on query data and/or fraudulent use data associated with the CPE devices) and request display or peripheral identification data from the identified CPE devices. For example, fraud detection logic 220 of FIG. 2 can identify one or more specific CPE devices to query. In some implementations, a network fraud detection manager can identify one or more CPE devices to query from a list of CPE devices suspected of being used fraudulently. For example, a list of CPE devices suspected of being used fraudulently can include CPE devices that exhibit a change in upstream channels used and/or CPE devices that exhibit a change in average timing offset. In still other implementations, a network fraud detection manager can periodically request display or peripheral identification data from one or more CPE devices.

After a request is made for the identification of one or more display or peripheral devices connected to one or more CPE devices, the process 300 can proceed to stage 320. At stage 320, display and/or peripheral identification data (e.g., information associated with a display or peripheral device connected to a CPE device including device manufacturer identity, product code, serial number, SSID, device security parameters, etc.) can be gathered. The display and/or peripheral identification data can be gathered, for example, by a CPE device that is connected to a display or peripheral device. In some implementations, a CPE device can request and receive display and/or peripheral identification data from a display or peripheral device connected to the CPE device. For example, a STB can request and receive display identification data through an interface connecting the STB to a display device (e.g., HDMI, RCA connector, etc.). As another example, a media gateway can request and receive peripheral identification data through an interface connecting the media gateway to a peripheral device (e.g., Wi-Fi interface, MoCA interface, etc.). In various implementations, a display or peripheral device can transmit display or peripheral identification data, identifying itself, to a CPE device when the display or peripheral device is connected to the CPE device. In some implementations, a CPE device can create and maintain a connection inventory (e.g., a list of display and/or peripheral devices and corresponding display and/or peripheral identification data of devices that are and/or have been connected to the CPE device) in a data store that can be internal or external to the CPE device. For example, when a display device is connected to a STB, the STB can receive display identification data associated with the display device via the interface between the display device and the STB (e.g., HDMI), and the STB can store the display identification data in a connection inventory. As another example, when a peripheral device (e.g., computer, television, mobile device, tablet, printer, etc.) is connected to a media gateway, the media gateway can receive peripheral identification data associated with the peripheral device via the interface between the peripheral device and the media gateway (e.g., Wi-Fi interface, MoCA interface, etc.), and the media gateway can store the peripheral identification data in a connection inventory. In various implementations, a CPE device can transmit gathered identification data and/or identification data stored in a connection inventory to a network fraud detection manager via a network connection.

After display and/or peripheral identification data is received by a network fraud detection manager, the process 300 can proceed to stage 330. At stage 330, received display and/or peripheral identification data can be compared to prior display and/or peripheral identification data associated with a CPE device. For example, display and/or peripheral identification data received from a CPE device can be compared to prior display and/or peripheral identification data (e.g., historical identification data) associated with the CPE device. The received display and/or peripheral identification data and the prior display and/or peripheral identification data can be compared, for example, by fraud detection logic (e.g., fraud detection logic 220 of FIG. 2). In some implementations, fraud detection logic 220 can retrieve prior display and/or peripheral identification data associated with a CPE device from a storage component (e.g., connection identification data store 230 of FIG. 2). For example, a data store (e.g., connection identification data store 230, an external storage device, etc.) can be operable to store prior display and/or peripheral identification data associated with a plurality of CPE devices. In various implementations, a fraud detection manager can compare received display and/or peripheral identification data to display and/or peripheral identification data stored in a connection inventory (e.g., a list of display and/or peripheral devices and corresponding identification data associated with devices that are and/or have been connected to a CPE device) that is maintained by a CPE device. In some implementations, a fraud detection manager can store received display and/or peripheral identification data associated with a display or peripheral device connected to a CPE device (e.g., the data can be stored in a connection identification data store 230, an external storage device, etc.). In some implementations, prior display and/or peripheral identification data can be replaced by the received display or peripheral identification data so that the data store or storage device contains the most recent identification data associated with a plurality of CPE devices.

After received display and/or peripheral identification data is compared to prior display and/or peripheral identification data associated with a CPE device, the process 300 can proceed to stage 340. At stage 340, a determination can be made whether the received display and/or peripheral identification data is different than the prior display and/or peripheral identification data associated with the CPE device. A determination whether the received display and/or peripheral identification data is different than the prior display and/or peripheral identification data can be made, for example, by fraud detection logic (e.g., fraud detection logic 220).

If the determination is made that the display or peripheral identification data received from a CPE device is different from the prior display or peripheral identification data associated with the CPE device, then the process 300 can proceed to stage 350. At stage 350, a CPE device can be flagged as being suspected of fraudulent use. For example, the identity of the CPE device from which display or peripheral identification data was received can be placed in a list containing devices that are suspected of fraudulent use. The identity of the CPE device can be directed into a list of CPE devices suspected of fraudulent use, for example, by fraud detection logic 220. In some implementations, a list of CPE devices suspected of fraudulent use can be stored in a data store internal to a fraud detection manager or a storage device external to the fraud detection manager. After a CPE device is flagged as being suspected of fraudulent use, the process 300 can end at stage 360.

If, at stage 340, the determination is made that the display or peripheral identification data received from a CPE device is not different from the prior display or peripheral identification data associated with the CPE device, then the process 300 ends at stage 360.

It should be appreciated, that the scope of this disclosure can be extended to identifying fraudulent behavior in various CPE devices. For example, a cable modem (CM), digital subscriber line (DSL) modem or embedded multimedia terminal adapter (EMTA) can identify and report the computer, or other peripheral devices, to which they are attached. Such data can be recorded for comparison of the current data to historical data to determine whether a CPE device is being switched frequently from one premise to another.

Figure 4:
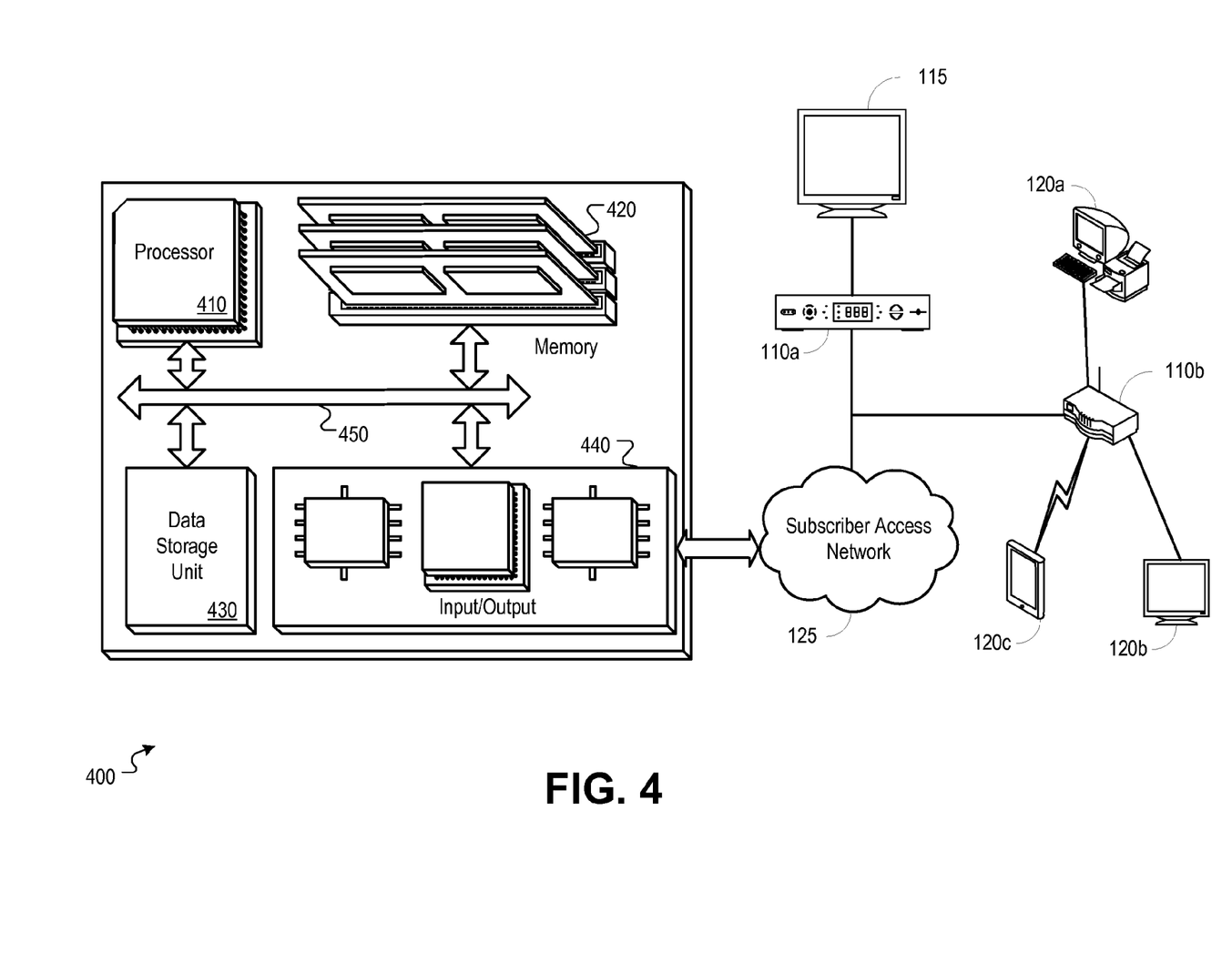
FIG. 4 is a block diagram of a hardware configuration operable to facilitate detecting fraudulent use of a customer premise equipment device.

FIG. 4 is a block diagram of a hardware configuration 400 operable to facilitate detecting fraudulent use of a CPE device. While a network performance manager is shown, it should be understood that other kinds of devices can facilitate detecting fraudulent use of a CPE device. The hardware configuration 400 can include a processor 410, memory 420, a data storage unit 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit. In various implementations, the memory can be used to store display and/or peripheral identification data received from a CPE device (e.g., STB 110a, media gateway 110b, etc.). In some implementations, the memory can be capable of storing a list of CPE devices suspected of fraudulent use.

In some implementations, the storage unit 430 can be capable of providing mass storage for the hardware configuration 400. In one implementation, the storage unit 430 can be a computer-readable medium. In various other implementations, the storage unit 430 can, for example, include a hard disk device, an optical disk device, flash memory or some other large capacity storage device. In other implementations, the storage unit 430 can be a device external to the hardware configuration 400. In various implementations, the storage unit can be capable of storing display and/or peripheral identification data received from a CPE device and/or prior identification data associated with the CPE device. In other implementations, the storage unit can be capable of storing a list of CPE devices suspected of fraudulent use.

The input/output device 440 can provide input/output operations for the hardware configuration 400. In some implementations, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). For example, the input/output device can include an interface device operable to communicate with a subscriber access network 125 (e.g., HFC network). In various implementations, the input/output device can include driver devices configured to receive input data and send output data to a data store and/or a storage device external to the hardware configuration 400. In some implementations, the input/output device can be operable to receive display and/or peripheral identification data associated with a display device 115 connected to a STB 110a or a peripheral device 120a-c connected to a media gateway 110b. For example, the input/output device can receive display identification data from a STB 110a via a subscriber access network 125. In various implementations, a CPE device can receive display or peripheral identification data from a display or peripheral device through an interface connecting the CPE device to the display or peripheral device (e.g., through an HDMI, Wi-Fi interface, MoCA interface, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. One or more non-transitory computer readable media operable to execute on one or more processors, the computer readable being operable to cause the one or more processors to perform the operations comprising:
   identifying a device connected to a customer premise equipment device by retrieving identification data associated with the identified device through an interface connecting the identified device to the customer premise equipment device, wherein the interface connecting the identified device to the customer premise equipment device is not a Data Over Cable Service Interface Specification (DOCSIS) interface;
   comparing the identification data associated with the identified device to identification data associated with each of one or more devices that were previously connected to the customer premise equipment device;
   determining that the identification data associated with the identified device is different from the identification data associated with each of the one or more devices that were previously connected to the customer premise equipment device, and thus that the identified device has not been previously connected to the customer premise equipment device; and
   classifying the customer premise equipment device as a customer premise equipment device suspected of fraudulent use, wherein the classification is based upon the determination that the identified device has not been previously connected to the customer premise equipment device.

2. The one or more non-transitory computer-readable media of claim 1, wherein identification data comprises an identity of a manufacturer of the device, a product code associated with the device, a serial number associated with the device, a service set identifier, or security parameters associated with the device.

3. The one or more non-transitory computer-readable media of claim 1, wherein the customer premise equipment device retrieves the identification data associated with the identified device through the interface connecting the customer premise equipment device to the identified device when the identified device is connected to the customer premise equipment device.

4. The one or more non-transitory computer-readable media of claim 1, wherein the interface connecting the identified device to the customer premise equipment device comprises a Wi-Fi interface or a multimedia over coax alliance interface.

5. The one or more non-transitory computer-readable media of claim 1, further operable to cause the one or more processors to perform the operations comprising:
   identifying a customer premise equipment device to query for current device identification data associated with a device connected to the customer premise equipment device, wherein the customer premise equipment device is identified based on a classification of the customer premise equipment device as a device suspected of fraudulent use.

6. A computer-implemented method, comprising:
   identifying a display device connected to a set-top box at a fraud detection component, wherein the display device is identified based upon information associated with the display device, the information being retrieved by the set-top box through an interface connecting the display device to the set-top box, wherein the interface connecting the display device to the set-top box is not a Data Over Cable Service Interface Specification (DOCSIS) interface;
   comparing the information associated with the display device to information associated with each of one or more devices that were previously connected to the set-top box;
   determining at the fraud detection component that the information associated with the identified display device is different from the information associated with each of the one or more devices that were previously connected to the set-top box, and thus that the identified display device has not been previously connected to the set-top box; and
   classifying the set-top box as a set-top box suspected of fraudulent use at the fraud detection component, wherein the classification is based upon the determination that the identified display device has not been previously connected to the set-top box.

7. The computer-implemented method of claim 6, wherein the display device connected to the set-top box is identified by receiving current display identification data associated with the display device through an interface connecting the display device to the set-top box, and the set-top box is operable to report the display identification data to the fraud detection component.

8. The computer-implemented method of claim 7, wherein the current display identification data comprises an identity of a manufacturer of the display device, a product code associated with the display device, or a serial number associated with the display device.

9. The computer-implemented method of claim 7, wherein the set-top box receives the current display identification data associated with the display device when the display device is connected to the set-top box.

10. The computer-implemented method of claim 7, wherein the interface connecting the display device to the set-top box comprises a high-definition multimedia interface.

11. The computer-implemented method of claim 6, wherein determining that the identified display device is a different device than one or more devices previously connected comprises detecting that a different type of input is used than was previously used, wherein the set-top box inputs comprise two or more input types selected from the group comprising a high-definition multimedia interface, a component video interface, a composite interface, an s-video interface, or a digital visual interface.

12. The computer-implemented method of claim 6, further comprising:
identifying a set-top box to query for current display identification data associated with a display device connected to the set-top box, wherein the set-top box is identified based on a classification of the set-top box as a device suspected of fraudulent use.

13. The computer-implemented method of claim 6, wherein the determination that the identified display device is a different device than one or more devices previously connected to the set-top box is made by comparing current display identification data associated with the identified display device to historical display identification data associated with one or more devices previously connected to the set-top box.

14. The computer-implemented method of claim 13, wherein the historical display identification data associated with one or more devices previously connected to the set-top box is stored by the set-top box in a data store or a storage device external to the set-top box.

15. The computer-implemented method of claim 6, further comprising:
correlating a difference between the identified display device and one or more devices previously connected to the set-top box with a change in identity of one or more upstream channels associated with the set-top box or with a change in a timing offset associated with the set-top box.

16. The computer-implemented method of claim 6, further comprising:
identifying a gateway device connected to the set-top box via an interface connecting the set-top box to the gateway device;
identifying one or more peripheral devices connected to the gateway device via the interface connecting the set-top box to the gateway device;
determining whether the one or more identified peripheral devices are different peripheral devices than one or more peripheral devices previously connected to the gateway device; and
correlating a difference between the one or more identified peripheral devices and one or more peripheral devices previously connected to the gateway device with a difference between the identified display device and one or more display devices previously connected to the set-top box.

17. A system, comprising:
an interface operable to be used to receive identification information identifying a display device connected to a set-top box, wherein the identification information is retrieved by the set-top box from the display device through an interface connecting the display device to the set-top box, wherein the interface connecting the display device to the set-top box is not a Data Over Cable Service Interface Specification (DOCSIS) interface;
a data store operable to store computer program instructions; and
a processor operable to execute said computer program instructions, the computer program instructions being operable to cause the processor to:
compare the identification information identifying the display device connected to the set-top box to identification information associated with each of one or more devices that were previously connected to the set-top box;
determine that the identification information identifying the display device connected to the set-top box is different from the identification information associated with each of the one or more devices that were previously connected to the set-top box, and thus that the display device connected to the set-top box has not been previously connected to the set-top box; and
classify the set-top box as a set-top box suspected of fraudulent use, wherein the classification is based upon the determination that the display device connected to the set-top box has not been previously connected to the set-top box.

18. The system of claim 17, wherein the information identifying the display device connected to the set-top box comprises an identity of a manufacturer of the display device, a product code associated with the display device, or a serial number associated with the display device.

19. The system of claim 17, wherein the set-top box retrieves the information identifying the display device connected to the set-top box through the interface connecting the set-top box to the display device when the display device is connected to the set-top box.

20. The system of claim 17, wherein said computer program instructions are further operable to cause the processor to:
identify a set-top box to query for information identifying the display device connected to the set-top box, wherein the set-top box is identified based on a classification of the set-top box as a device suspected of fraudulent use.

21. The system of claim 17, wherein the determination that the identified display device is a different display device than one or more display devices previously connected to the set-top box is made by comparing current display identification data associated with the identified display device to historical display identification data associated with one or more display devices previously connected to the set-top box.

22. The one or more non-transitory computer-readable media of claim 1 further comprising:

identifying one or more elements associated with the connection between the identified device and the customer premise equipment device;

comparing the one or more elements associated with the connection between the identified device and the customer premise equipment device to one or more elements associated with each of one or more connections between the customer premise equipment device and devices that were previously connected to the customer premise equipment device;

determining that one or more of the elements associated with the connection between the identified device and the customer premise equipment device is different from one or more respective elements associated with each of the one or more connections between the customer premise equipment device and devices that were previously connected to the customer premise equipment device; and further classifying the customer premise equipment device as a customer premise equipment device suspected of fraudulent use.

\* \* \* \* \*